Aug. 13, 1968  J. J. RAPHAEL ET AL  3,396,620
SUPPORT FOR A STEEL RULE DIE MEMBER AND METHOD
OF PRODUCING THE SAME
Filed Sept. 15, 1966  2 Sheets-Sheet 1

INVENTORS
JULIAN J. RAPHAEL
ELLIOTT SHULMAN

BY *[signature]*

ATTORNEY.

United States Patent Office 3,396,620
Patented Aug. 13, 1968

3,396,620
SUPPORT FOR A STEEL RULE DIE MEMBER AND METHOD OF PRODUCING THE SAME
Julian J. Raphael, 158 Midgely Drive, Hewlett, N.Y. 11557, and Elliott Shulman, 117—31 220th St., Cambria Heights, N.Y. 11411
Filed Sept. 15, 1966, Ser. No. 579,714
21 Claims. (Cl. 83—686)

The present invention relates to steel rule dies for metal cutting, in general, and to a support and method of fabricating a support for a steel rule die member.

All mating steel rule dies have a common fault in that the steel rules deflect during the stamping operation of the piece part of metal, plastic or the like. Deflection of the rules is one of the most serious problems in the stamping industry. For heavy gage and or hard material stamping, deflection is pronounced and produces severe consequences, especialy where the die building has been performed in such a manner that one or more of the dimensions of the die is already at its high or low limits of tolerance, which is frequently the case with the present methods of manufacturing of steel rule cutting dies. The slightest rule deflection may throw the part out of tolerance as well as cause permanent injury to the die rules.

Rule deflection has been the cause for some of the stripping problems encountered with present steel rule dies, and is a primary cause of early failure, since the rule cutting edges are not only not hard enough but are also subjected to excessive wear due to sticking of the piece part in the die cavity. Furthermore, rule deflection is a variable around the periphery of the rules and therefore can cause non-uniformity of manufactured parts. The deflection of the rules can cause a part to be larger than it was designed to be, and in cases where stacking of the stamped parts are required such as with laminations, there may be such wide variations in size from one stamping to another that the die does not serve the purpose for which it was made.

The steel rules currently used project from a kerf (i.e., cut) formed in a hard die board. Rule deflection in addition to being a function of the characteristics of the die board and the kerf is also a function of the distance by which the die rule projects from the die board and the thickness, hardness, and material of the rule, as well as, of course the characteristics of the part to be manufactured.

In present die rule practice, the kerf is formed by cutting the die board prior to the manfuacture and bending of the rules. Next, the rules are independently bent to the contour of the part to be manufactured. Since the kerf and the rules are made independently, differences in accuracy of the shape of the blades and the kerf arise. Accordingly, with present die rule making practices, the die board does not continuously engage the entire periphery of the rules in the kerf. To compensate for the differences in measurements between the independently formed kerf and the rules, the rules are made softer than would normally be desired so that they can be pressed into a somewhat tolerable fit in the kerf of the die board. This further complicates the problems of rule deflection because soft rules deflect more easily than hard rules. Also, since the rules are usually formed in sections, deflection can occur at any small portion about the rule periphery requiring complete and continuous abutting peripheral support. Finally, the cross-sections of the rules (in the vertical direction) may not be exactly uniform, adding to the difficulties.

Therefore, it is an object of the present invention to provide a high tensile strength peripheral rule support and a method of making same wherein the rule is support continuously abuts the rule sections at all points of the support adjacent the rule conforming precisely to outer peripheral shape of the rules.

It is another object of the present invention to provide a cutting die including a cutting die member having a cutting rule and engaged within a kerf in a die board, the cutting die perpendicularly projecting from the die board to a cutting end, the cutting rule, including an inner surface and an outer surface, the inner surface of the cutting rule having a substantially uniform cross-section complementary to the dimensions and configuration of the part to be manufactured, the outer surface of the cutting rule having a cross-section of substantially uniform configuration, the outer surface defining an outer cutting edge adjacent the cutting end of the rule; a support for the cutting rule comprising a high tensile strength member having a cross-section larger than the cross-section of substantially uniform configuration of the outer surface of the cutting rule, the high tensile strength member including an inner edge defining an opening precisely complementary in configuration and dimension to the cross-section of substantially uniform configuration of the outer surface of the cutting rule, the inner edge being disposed about the outer surface of the cutting rules, thereby engaging the outer surface in precise continuous abutment, and the high strength member disposed about the outer surface adjacent the cutting end of the cutting rule thereby supporting the cutting end of the cutting rule.

It is still another object of the present invention to provide a method for forming the previously mentioned support for a cutting rule comprising the steps of mounting the cutting die member in a die press, forming a blanking die member with a blanking member inner edge defining a blanking member opening complementary in configuration and dimension to the cross-section of the outer cutting edge of the cutting rule, removably mounting the blanking die member in the die press with the blanking member opening in cooperative alignment with the outer cutting edge of the cutting rule, placing a slab of metal larger than the cross-section of the outer cutting edge of the cutting rule adjacent the blanking die member covering the blanking member opening, and closing the die press so that the outer cutting edge of the cutting rule and the blanking member inner edge shear the metal slab to form the high tensile strength member and forcing the high tensile strength member about the outer surface of the cutting rule adjacent the cutting end of the cutting rule.

It is yet another object of the present invention to provide a support for the cutting rule in accordance with the second mentioned objective wherein the high tensile strength member comprises a plurality of metal layers, each of the layers includes a layer inner edge defining a layer opening conforming to the shape and dimensions of the cross-section of substantially uniform configuration of the outer surface of the cutting rule, each of the layers perpendicularly and complementary disposed about the cutting rule with the entire layer inner edge continuously abutting the outer surface of the cutting rule, the layers stacked in contiguous adjacent relationship relative to each other, and one of the layers substantially adjacent the cutting end of the cutting rule.

It is yet another object of the present invention to provide a method for forming the previously mentioned support for a cutting role comprising the steps of mounting the cutting die member in a die press, forming a blanking die member with a blanking member inner edge defining a blanking member opening complementary in configuration and dimension to the cross-section of the outer cutting edge of the cutting rule, removably mounting the blanking die member in the die press with the blanking member opening in cooperative alignment with the outer cutting edge of the cutting rule, placing a piece of sheet metal larger than the cross-section of the outer cutting edge of the cutting rule adjacent the blanking die member covering the blanking member opening, closing the die press so that the outer cutting edge of the cutting rule and the blanking member inner edge shear the sheet metal to form a sheared first scrap web layer about the outer surface of the cutting rule adjacent the cutting end of the cutting rule, opening the die press and placing another piece of sheet metal larger than the cross-section of the outer cutting edge of the cutting rule adjacent the blanking member covering the blanking member opening, and closing the die press so that the outer cutting edge of the cutting rule and the blanking member inner edge shear the other sheet metal piece to form another sheared scrap web layer and forcing the other sheared scrap web layer against the first scrap web layer thereby causing the first scrap web layer to move towards the die board and causing the other scrap web layer to be contiguous to the first scrap web layer and to be continuously disposed in abutting engagement about the outer surface of the cutting rule adjacent the cutting end of the cutting rule.

With these and other objects in view which will become apparent in the following detailed description, the present invention will be clearly understood in connection with the accompanying drawings, in which.

Figure 1:
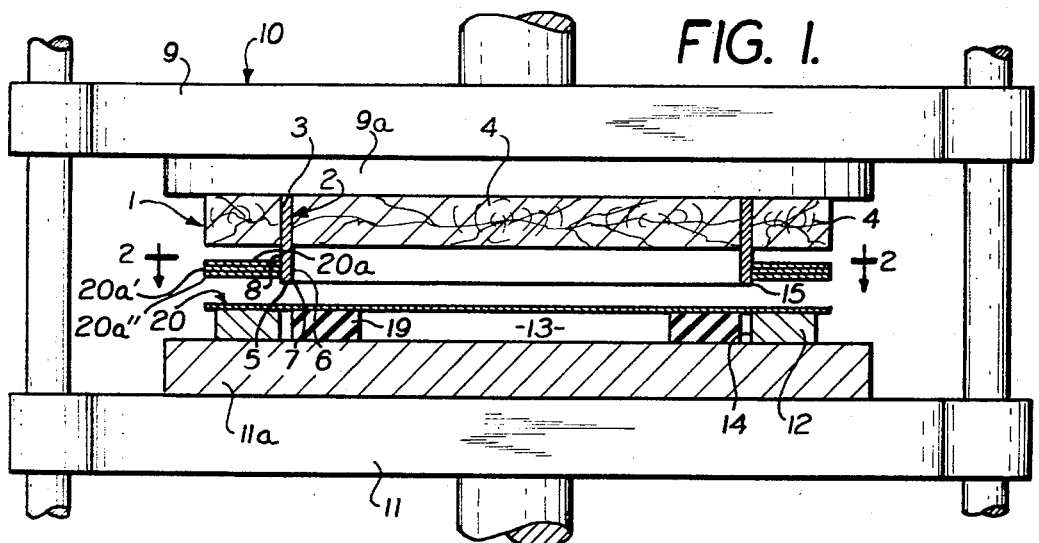
FIGURE 1 is an elevational view of a scrap web support for a die rule and showing the method for forming the scrap web support.
Figure 2:
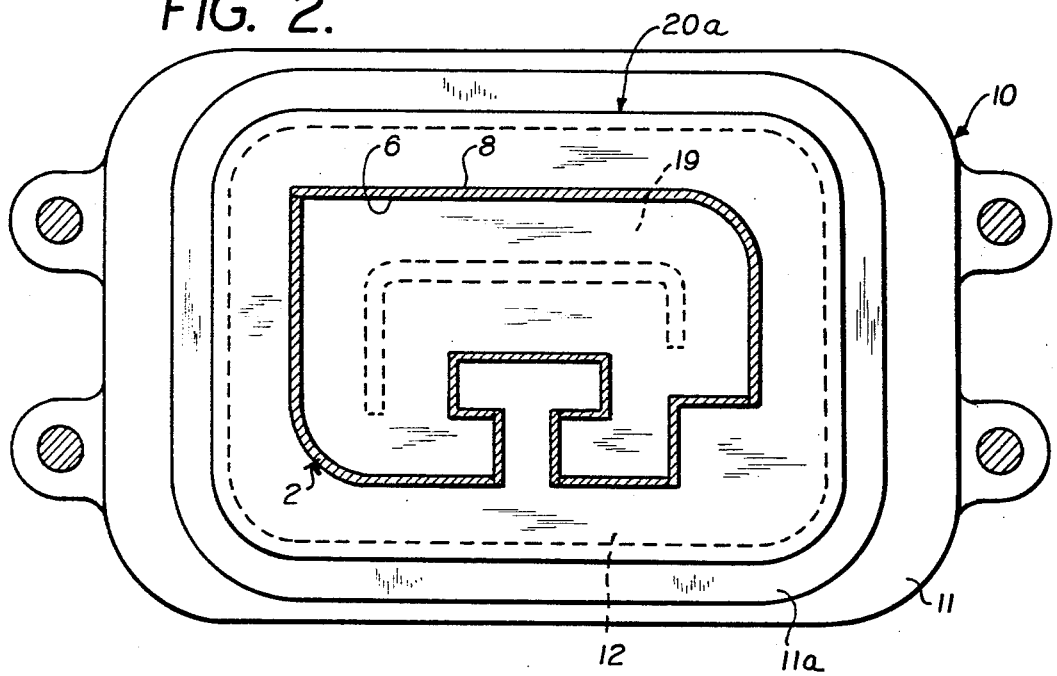
FIG. 2 is a cross-sectional view along the lines 2—2 of FIG. 1.

Referring now to the drawings, and in particular to FIGS. 1 and 2 for the method of fabrication of the support of the present invention for the rules of a die cutting member, a conventional die cutting member 1 is shown comprising rules 2 conventionally pressed in a kerf 3 formed in a die board 4. The cutting member 1 may be fabricated by any of several well known methods. In particular it may be formed by the method of our co-pending patent application, entitled "Method of Producing Steel Rule Dies," filed the same day as the filing date of the present patent application.

The rules 2 are preferably formed in sections, as shown in FIG. 2, and project perpendicularly from the die board 4 terminating in a cutting end 5. The rules 2 include an inner surface 6, conforming to the configuration of the part to be manufactured by the completed die assembly (FIG. 7), and for shearing the part to be manufactured, as will hereinafter be further explained, by the inner cutting edge 7 of the cutting end 5 of the rules 2 during operation of the completed die assembly of FIG. 7.

The rules 2 also include an outer peripheral surface 8 separated from the inner surface 6 by the width of the rules 2. The rules 2 are formed so that the inner and outer surfaces 6 and 8, respectively, have a substantially uniform cross-section as shown in FIG. 2.

The cutting die member 1 after fabrication is mounted preferably in the upper shoe 9 on a mounting member 9a, of a die press 10. Removably mounted on the lower shoe mounting plate 11a of the lower shoe 11 of die press 10 is a temporary blanking die member 12 having a cross-section larger than that of the outer surface 8 of the rule 2. The blanking die member 12 is aligned in the die press 10 relative the rules 2 so as to project laterally beyond the outer peripheral surface 8 of the rules 2 as may be seen in FIG. 2.

The blanking member 12 is formed with a blanking member opening 13 having an inner edge 14 complementary to the dimensions and configuration of the outer surface 8 of the cutting rule 2, and in particular, complementary to the outer cutting edge 15 of the cutting end 5 of the rule 2. The blanking member 12 is aligned in the lower shoe 11 on mounting plate 11a in a cooperative and complementary alignment with the outer surface 8 and outer cutting edge 15 of the rules 2, so that when the die press (FIG. 1) is closed, the inner edge 14 of the blanking member opening 13 movably engages the end of the outer surface 8 adjacent the cutting edge 15 of the rules 2. The outer cutting edge 15 of the outer surface 8 of the cutting end 5 of the rule 2, and the inner edge 14 of the blanking member opening 13, together form temporary shearing edges for fabricating the rule support of the present invention, as hereinafter described.

The fabrication of a completed steel rule die frequently includes the fabrication of a metal punch 16 (FIG. 7) which when finally mounted in the die press 10 conforms to and cooperates with the inner cutting edge 7 of the cutting end 5 of the rules 2 for shearing the parts to be manufactured. The punch 16, is usually cut to size from a larger tool steel punch plate and the remainder of the punch plate is discarded. Preferably this remainder of the punch plate is used as the blanking member 12, since it inherently has an opening complementary to the shape of the die rules, from which opening the punch 16 was formed. This opening is machined and finished to exactly conform to the outer surface 8 of the rule 2 thereby defining the inner edge 14 of opening 13. Further, as described in my co-pending patent application, heretofore referred to, the punch plate may be scribed with inner and outer scribe lines, representing the inner and outer surfaces 6 and 8, respectively, of the die rule 2. The punch plate is then cut between the inner and outer scribe lines and the roughly formed punch 16 is removed and finished precisely to the inner scribe line to conform to the inner surface 6 of the rules 2. The remainder of the punch plate may then be finished precisely to the outer scribe line to conform to the outer surface 8 of the rules 2 forming the inner edges 14 of a blanking member 12 and the opening 13.

Figure 3:
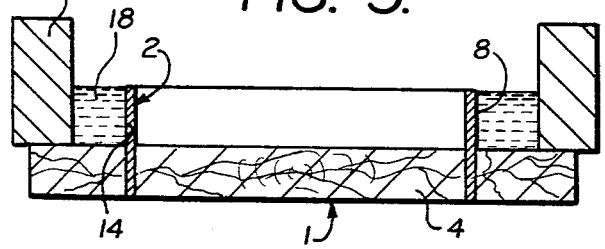
FIG. 3 is an elevational view of the formation of an epoxy blanking die member.

As an alternative method for manufacturing the blanking member, reference is briefly made to FIG. 3. A blanking member 12 may be formed by first inverting the cutting member 1 so that the rules 2 extend upwards. A liquid retaining wall 17 is provided in spaced relationship about the rule 2 forming a ring-shaped cavity therebetween. A hardenable epoxy material 18 is poured into the ring-shaped cavity and permitted to harden so as to form a temporary blanking member 12. The hardened blanking member 12 so formed has an edge 14 defining the blanking member opening 13 which conforms exactly to the outer surface 8 of the rules 2. The epoxy member may then be used as the blanking member 12 and positioned on the mounting plate 11a of the lower shoe 11 of the die press 10 as heretofore described.

Referring again to the drawings, and in particular to FIG. 1, a rubber stripper ring 19 is formed and mounted on the mounting plate 11a within the blanking die member opening 13. The stripper 19 is uniformly spaced from the inner edge 14 of the opening 13 at a distance equal to the width of the die rule 2. This provides space for the entry of the cutting end 5 of the rule 2 when the die press 10 is closed, without causing undesired pressures against the rules 2 and possible deflection of the rules 2 during fabrication of the rule support.

To form and position a high tensile strength rule support, a preferably light gage metal of high tensile strength, for example, a piece of sheet metal 20, is now placed on the blanking member 12, covering the blanking member opening 13.

Figure 4:
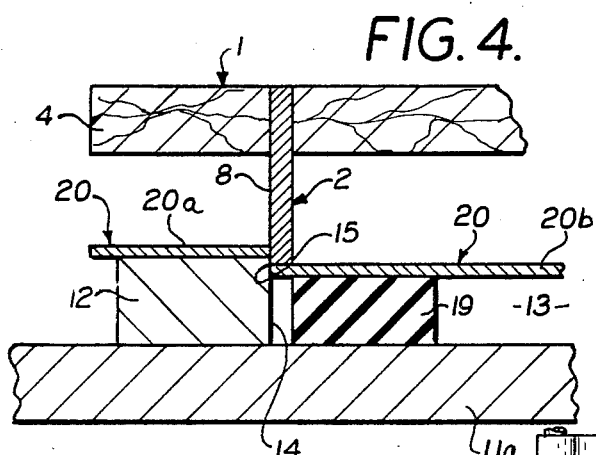
FIG. 4 is an enlarged sectional view of FIG. 1 illustrating the first scrap web layer formed.

As shown in FIG. 2, the sheet metal piece 20 completely covers the outer peripheral surface 8 of the rules 2. Referring specifically now to FIG. 4, the die press 10 is then closed bringing the inner edge 14 of the blanking member 12 to a position slightly above the outer cutting edge 15 of the rules 2, thereby shearing the metal sheet piece 20 into a scrap web portion 20a and a centerpiece portion 20b, by the outer cutting edge 15 of the rules 2 and by the inner edges 14 of the blanking die member 12. This operation forces the scrap web portion 20a up about the outer surface 8 of the rules 2, snugly engaging the rules 2 uniformly and continuously about an entire increment on the outer surface 8 of the rules 2. The rubber stripper ring 19 is compressed and the sheared centerpiece 20b is ejected by the rubber stripper ring 19 (FIG. 4) when the die press 10 is opened. The scrap web portion 20a, however, remains firmly supported about the rules 2 adjacent the cutting edge 5.

Figure 5:
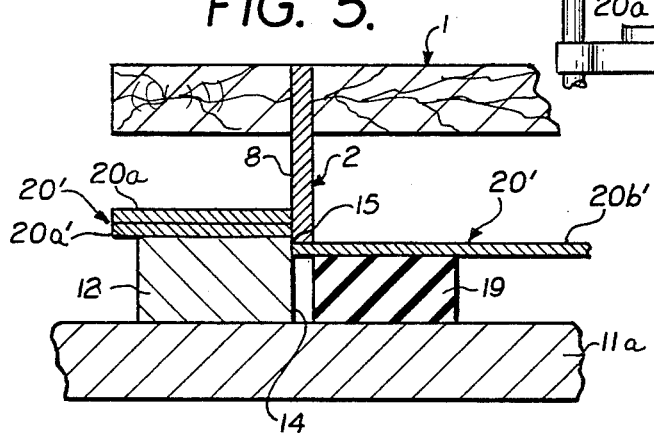
FIG. 5 is an enlarged sectional view of FIG. 1 illustrating the second scrap web layer formed.

Referring again to the drawings, and in particular to FIG. 5, another sheet metal piece 20' is then placed on the blanking die member 12 and the process is repeated. The second sheet metal piece 20' is sheared into a scrap web portion 20a' and a centerpiece 20b'. The scrap web portion 20a' forces the first formed scrap web 20a higher up on the outer peripheral surface 8 of the rules 2. The second scrap web 20a' remains adjacent the cutting edge 5 of the rules 2 after the die press 10 is opened and the centerpiece 20b' ejected. The above-described process is then repeated with additional sheet metal pieces until a number of contiguous scrap webs 20a are affixed about the outer surface 8 of the rules 2 to achieve the rule support desired.

Figure 6:
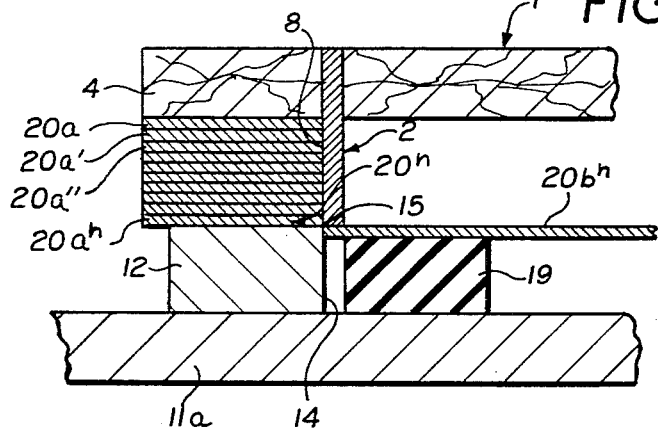
FIG. 6 is a similar view illustrating a scrap web support completely covering the die rule.

For light gage stamping it may only be necessary to provide a few scrap web supports, for example, as shown in FIG. 1, not entirely covering the entire outer surface 8 of the rules 2. However where maximum rule support is desired, the process may be repeated until the first scrap web 20a is pushed up against the die board 4, by the last scrap web 20a$^n$ which can fit on the rules 2 as shown in FIG. 6.

Figure 7:
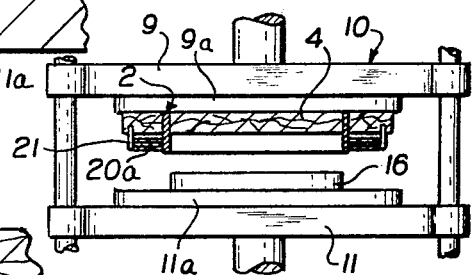
FIG. 7 shows an assembled steel rule die member with scrap web support, and punch member for the production of shaped metal parts.

After formation of the scrap web support, the outer surface 8 of the rules 2 is clamped by and supported with high tensile strength steel continuously around its outer peripheral surface 8, protecting against deflection of the rule during subsequent stamping operations of the part to be manufactured. The blanking die member 12 is then removed from the lower shoe 11 of the die press 10 and the punch 16 is mounted thereon, and the scrap web supported die assembly is ready for stamping operations to produce parts to be manufactured as shown in FIG. 7. To prevent the scrap webs 20a from falling from the rules 2 during stamping operations, screws, roll pins or other expansible dowels 21 may be attached to the die board.

Advantages of the invention should now be apparent. Whether a few scrap web layers, or a complete panoply is required, for particular stamping operations, the scrap webs always cover the most critical portion of the rules, namely the cutting end 5 where the consequences of rule deflection are most serious.

The scrap web layer support is far superior to a one piece, integral rule support although it is within the scope of this invention that a single thick scrap web, formed as described, will provide satisfactory rule support in certain applications. Also the blanking die 12 itself may be used as the outer peripheral rule support in certain cases, as the blanking die, formed as described, substantially conforms to the outer surface 8 of the rules 2. However, optimum rule support of the present invention is achieved wherein the individual scrap webs are relatively thin. (Although thicker sheets may be advantageous in certain instances, as it requires less sheets.) The advantages over a single thick integral support are obvious. With very thin webs, each web can conform exactly to the varying cross-section of the outer surface 8 of the rules 2. The cross-section of the outer surface 8 of the rules 2 is substantially uniform, but like all formed pieces, it is subject to minute dimensioned variations. Each thin web can accommodate to the minute variations in the dimensions of the outer surface 8, and together an array of thin individual scrap webs provide a continuous rule support abutting the entire periphery of the rules, better than that achieved with a one piece integral rule support. Each scrap web being thin can resiliently accommodate itself to the variations of the outer surface 8 of the rules and rigidly hold the rules in support engagement.

While we have disclosed several embodiments of the present invention, it is to be understood that these embodiments are given by example only and not in a limiting sense, the scope of the present invention being determined by the objects and the claims.

We claim:
1. In a cutting die including a cutting die member having a cutting rule and engaged within a kerf in a die board, said cutting die perpendicularly projecting from said die board to a cutting end, said cutting rule including an inner surface and an outer surface, said inner surface of said cutting rule having a substantially uniform cross-section complementary to the dimensions and configuration of the part to be manufactured, said outer surface of said cutting rule having a cross-section of substantially uniform configuration, said outer surface defining an outer cutting edge adjacent said cutting end of the rule; a support for the cutting rule comprising:
    a high tensile strength member having a cross-section larger than said cross-section of substantially uniform configuration of said outer surface of said cutting rule,
    said high tensile strength member including an inner edge defining an opening precisely complementary in configuration and dimension to said cross-section of substantially uniform configuration of said outer surface of said cutting rule, said inner edge being disposed about said outer surface of said cutting rule, thereby engaging said outer surface in precise continuous abutment, and
    said high tensile strength member disposed about said outer surface of said cutting rule thereby supporting said cutting rule.

2. The support for a cutting rule, as set forth in claim 1, wherein
    said high tensile strength member is disposed about said outer surface adjacent said cutting end of said cutting rule thereby supporting said cutting end of said cutting rule.

3. The support for a cutting rule, as set forth in claim 1, wherein
    said high tensile strength member comprises,
    a plurality of layers,
    each of said layers includes a layer inner edge defining a layer opening conforming to the shape and dimensions of said cross-section of substantially uniform configuration of said outer surface of said cutting rule, and
    each of said layers perpendicularly and complementary disposed about said cutting rule with said entire layer inner edge continuously abutting said outer surface of said cutting rule.

4. The support for a cutting rule, as set forth in claim 3, wherein
    one of said layers is substantially adjacent said cutting end of said cutting rule.

5. The support for a cutting rule, as set forth in claim 4, wherein
    said layers are stacked in contiguous relationship relative to each other.

6. The support for a cutting rule, as set forth in claim 5, wherein
    said layers each are of light gage metal material and thin relative the length of said cutting rule from said cutting end to said die board.

7. The support for a cutting rule, as set forth in claim 6, further comprising
    means attached to said die board and said layers for holding said layers in position.

8. The support for a cutting rule, as set forth in claim 6, wherein
said layers extend in stacked contiguous relationship from said cutting end of said cutting rule to said die board thereby completely covering said outer surface of said cutting rule in continuous abutment.

9. A method of forming a support for a cutting rule mounted in a kerf of a die board of a cutting die member and having an outer surface of said cutting rule defining at its free end an outer cutting edge, comprising the steps of
mounting said cutting die member in a die press,
forming a blanking die member having a blanking member inner edge defining a blanking member opening complementary in configuration and dimension to the cross-section of said outer cutting edge of said cutting rule,
mounting said blanking die member in said die press with said blanking member opening in cooperative alignment with said outer cutting edge of said cutting rule,
placing a layer of material larger than said cross-section of said outer cutting edge of said cutting rule adjacent said blanking die member covering said blanking member opening, and
closing said die press so that said outer cutting edge of said cutting rule and said blanking member inner edge shear said layer of material to form a first sheared support member and force said first sheared support member about said outer surface of said cutting rule to a predetermined position relative said cutting end of said cutting rule.

10. The method of forming a support for a cutting rule mounted in a kerf of a die board of a cutting die member and having an outer surface of said cutting rule defining at its free end an outer cutting edge, as set forth in claim 9, wherein
said die press is closed when shearing said layer of material so as to force said first sheared support member about said outer surface of said cutting rule to a position substantially adjacent said outer cutting edge of said cutting rule.

11. The method for forming a support for a cutting rule mounted in a kerf of a die board of a cutting die member and having an outer surface of said cutting rule defining at its free end an outer cutting edge, as set forth in claim 9, further comprising the steps of
opening said die press and repeating the last two steps with additional layers of material, sequentially, until a desired number of sheared support members are disposed about said outer surface of said cutting rule at predetermined positions relative said cutting end of said cutting rule.

12. The method for forming a support for a cutting rule mounted in a kerf of a die board of a cutting die member and having an outer surface of said cutting rule defining at its free end an outer cutting edge, as set forth in claim 11, wherein
said die press is closed when shearing the last desired layer so as to force the last sheared support member about said outer surface of said cutting rule to a position substantially adjacent said outer cutting edge of said cutting rule.

13. The method of forming a support for a cutting rule mounted in a kerf of a die board of a cutting die member and having an outer surface of said cutting rule defining at its free end an outer cutting edge, as set forth in claim 9, further comprising the steps of
opening said die press and placing another layer of material larger than said cross-section of said outer cutting edge of said cutting rule adjacent said blanking member covering said blanking member opening, and
closing said die press so that said outer cutting edge of said cutting rule and said blanking member inner edge shear said other layer of material to form a second sheared support member and force said second sheared support member against said first sheared support member thereby causing said first sheared support member to move towards said die board and causing said sheared support members to be contiguous and to be continuously disposed in abutting engagement about said outer surface of said cutting rule.

14. The method of forming a support for a cutting rule mounted in a kerf of a die board of a cutting die member and having an outer surface of said cutting rule defining at its free end an outer cutting edge, as set forth in claim 13, further comprising
repeating the last two steps with additional layers of material until a desired portion of said outer surface of said cutting rule is supported by contiguous sheared support members.

15. The method of forming a support for a cutting rule mounted in a kerf of a die board of a cutting die member and having an outer surface of said cutting rule defining at its free end an outer cutting edge, as set forth in claim 14, wherein
said closing steps force said sheared support members about said outer surface of said cutting rule, to a position adjacent said outer cutting edge of said cutting rule.

16. The method of forming a support for a cutting rule mounted in a kerf of a die board of a cutting die member and having an outer surface of said cutting rule defining at its free end an outer cutting edge, as set forth in claim 15, wherein
said layers of material are sheet metal.

17. The method of forming a support for a cutting rule mounted in a kerf of a die board of a cutting die member and having an outer surface of said cutting rule defining at its free end an outer cutting edge, as set forth in claim 15, wherein
repeating said last two steps with additional layers of material until said first sheared support member abuts said die board and said last sheared support member is adjacent said cutting edge of said cutting rule and said other sheared support members are contiguous to each other therebetween.

18. The method of forming a support for a cutting rule mounted in a kerf of a die board of a cutting die member and having an outer surface of said cutting rule defining at its free end an outer cutting edge, as set forth in claim 9, further comprising the step of
disposing a rubber stripper member within said blanking member opening prior to shearing said layer of material.

19. The method of forming a support for a cutting rule mounted in a kerf of a die board of a cutting die member and having an outer surface of said cutting rule defining at its free end an outer cutting edge, as set forth in claim 9, wherein
said blanking die member is formed by cutting and removing a scribed punch centerpiece from a tool steel punch plate, and
further comprising the steps of,
removing said blanking die member from said die press after said support is formed, and
replaceably mounting said punch centerpiece in said die press in cooperative alignment with said cutting rule.

20. The method of forming a support for a cutting rule mounted in a kerf of a die board of a cutting die member and having an outer surface of said cutting rule defining at its free end an outer cutting edge, as set forth in claim 9, wherein
said blanking die member is formed by the steps of,
supporting said cutting die member so that said cutting rules extend vertically upwards,
providing a liquid-tight wall on said die board about said outer surface of said cutting rule in spaced relationship from said outer surface forming a cavity therebetween, pouring a hardenable epoxy material in said cavity substantially filling said cavity to said cutting edge, permitting said epoxy material to harden therein, and removing said hardened epoxy material after said epoxy has hardened.

21. The method of forming a support for a cutting rule mounted in a kerf of a die board of a cutting die member and having an outer surface of said cutting rule defining at its free end an outer cutting edge, as set forth in claim 9, wherein said layer of material is metal.

References Cited

UNITED STATES PATENTS

| 2,899,849 | 8/1959 | Laughter et al. | 76—107 |
| 3,091,986 | 6/1963 | Tracey et al. | 83—685 X |
| 3,150,550 | 9/1964 | Berlin et al. | 83—685 X |

WILLIAM S. LAWSON, *Primary Examiner.*